Patented Aug. 10, 1943

2,326,121

UNITED STATES PATENT OFFICE 2,326,121

PREPARATION OF COMPOSITE FABRIC

Joseph E. Bludworth, Cumberland, Md., assignor to Celanese Corporation of America, a corporation of Delaware No Drawing. Application May 10, 1940, Serial No. 334,361

13 Claims. (Cl. 117—143)

This invention relates to the production of composite fabrics, and relates more particularly to the preparation of a laminating fabric for adhesively uniting the components of the composite fabric.

In processes for preparing fabrics of various degrees of stiffness, for use in wearing apparel or other technical or commercial articles, by effecting the coalescence of two or more layers of fabric by operations involving the use of heat and pressure, one of said layers comprising a laminating fabric containing at least some yarns, filaments or fibers of an organic derivative of cellulose and a plasticizer for the organic derivative of cellulose. These laminating fabrics are prepared by applying to a fabric made of or containing yarns, filaments or fibers of an organic derivative of cellulose, a suitable plasticizer or plasticizing compound in any suitable manner, as by dipping, spraying or padding the plasticizer or plasticizing compound in a solution in a volatile solvent therefor on to the fabric.

In the preparation of laminating fabrics containing yarns of thermoplastic filaments or fibers and cotton of other cellulosic yarns, the fabrics after the application of plasticizer thereto may be treated to cause the applied plasticizer to migrate from the cellulosic yarns to the thermoplastic yarns. I have found, however, that the plasticizer is not completely absorbed by the thermoplastic yarns, appreciable quantities of the plasticizer remaining on the surface of the fabric. I have further found that this superficial plasticizer does not aid in securing adhesion in hot pressing to produce a laminated product, and if the surface plasticizer is removed, the adhesion between the components of the laminated product, after the hot pressing operation, is appreciably changed. In fact, this surface plasticizer often has an adverse effect. Thus, in the manufacture of stiffened laminated shirt collars, for example, the surface plasticizer on the laminating fabric passes through the outer layers of the collar and gives the same an undesirable oily cast and soiled appearance when compared with the remaining portions of the shirt to which it is attached or to be attached. This is particularly true when the shirt and collar are white or a very light shade. Another factor which tends to lower considerably the utility of prior laminating fabrics is that the surface plasticizer is often very tacky and therefore foreign matter, such as lint produced by cutting operations, adheres to the laminating fabric and cannot easily be brushed off. The presence of this lint is apt to produce blemishes in the laminated articles, such as collars, causing serious defects in appearance, particularly where white fabrics or fabrics of light shades are being used and the lint is of some darker color or shade.

It is, accordingly, an important object of this invention to provide a process for preparing an improved laminating fabric which will be free from the above-mentioned and other disadvantages and which will be simple and expeditious in operation and inxpensive in cost.

It is also an object of this invention to prepare a laminating fabric containing yarns, filaments or fibers of an organic derivative of cellulose and a plasticizer therefor which is dry to the hand and which will be free from tackiness even after long exposure to atmospheric conditions.

Another object of this invention is to prepare a laminating fabric containing yarns, filaments or fibers of an organic derivative of cellulose and a plasticizer therefor, which may be easily handled or stored and which has enhanced binding power or adhesion when employed in the production of composite fabrics.

A further object of this invention is to prepare improved laminating fabric, suitable for use in the production of composite fabric of any desired degree of increased stiffness, which is dry, not greasy to the touch and free from tackiness and which may be put up in roll or bolt form and stored for an indefinite period of time without danger of the same sweating out the plasticizer.

Still another object of the invention is the provision of a laminating fabric which, when employed in the production of compositie fabrics, yields a product which will not appear oily and discolored due to the sweating of plasticizer through the outer layers thereof.

Other objects of this invention will appear from the following detailed description.

In accordance with this invention, I prepare a laminating fabric by applying a plasticizer to a fabric made of or containing an organic derivative of cellulose, by dipping, spraying, padding or otherwise treating said fabric with a plasticizer for the organic derivative of cellulose or solution thereof in a volatile solvent for said plasticizer, such as benzol, or preferably methyl or ethyl alcohol or other swelling agent for the organic derivative of cellulose, ageing the so-treated fabric for a period of 5 or more days, and then treating the aged laminating fabric with an alcohol such as, for example, methyl or ethyl alcohol and then again ageing the fabric for a period of from 1 to 3 days. This additional treatment, or after-treatment, with the alcohol not only removes a substantial portion of the superficial plasticizer from the fabric but also causes the same to penetrate more deeply and in greater quantity into the thermoplastic component of the fabric. I have found that this alcohol after-treatment and subsequent additional ageing yields a product which is free from tackiness, is dry to the touch and, moreover, requires a lesser quantity of plasticizer while giving better adhesion.

While this invention is particularly applicable in connection with laminating fabrics containing cellulose acetate as the thermoplastic material it may be used with other thermoplastic derivatives of cellulose such as cellulose propionate and cellulose butyrate and cellulose ethers such as ethyl cellulose and benzyl cellulose. My process also contemplates the use of fabrics containing mixed esters of cellulose such as, for example, aceto-propionate and cellulose aceto-butyrate, and also synthetic linear polyamide condensation products such as the polyamides derived from amino-acids or from the condensation or diamines with carboxylic acid, e. g. polyhexamethylene adipamide. However, this invention will be described more specifically in connection with cellulose acetate, and while the acetone-soluble cellulose acetate will generally be employed because of its commercial availability, cellulose acetate of other solubility characteristics may be used in my process.

Any suitable plasticizer may be employed in accordance with my process. For example, in the case where the fabric to be treated contains cellulose acetate there may be employed ethyl para-toluene sulphonamide, monomethyl xylene sulphonamide, dimethyl phthalate, diethyl phthalate, triphenyl phosphate, dibutyl tartrate or mixtures of two or more of these. The amount of plasticizer used will generally be from 80 to 150% based on the weight of the cellulose acetate present in the fabric.

A preferred plasticizing solution for application to the fabric consists of about 60 parts of dimethoxy ethyl phthalate, and 40 parts of ethyl alcohol.

In order to increase the rate of absorption of the plasticizer by the cellulose acetate component of the fabric and in order to obtain a greater and better degree of absorption a penetrating agent for the cellulose acetate may be employed. These penetrating agents act upon the cellulose acetate component of the fabric in such a manner as to render the same more amenable to penetration by the plasticizer whereby the plasticizer is more readily absorbed thereby.

Any suitable penetrating agent may be employed. Examples of penetrating agents to be employed in this process in connection with cellulose acetate are Turkey red oil, xylene, toluene, monopol oil, pine oil, sulphonated pine oil, cyclohexanol, cyclohexanone, diacetin, tetralin, or mixtures of two or more of these materials. Examples of such mixtures are a mixture of Turkey red oil and xylene, a mixture of Turkey red oil, tetralin and sodium silicate, and a mixture of cyclohexanol, tetralin and soap.

The plasticized fabric is aged, in roll form if desired, for at least 5 days and preferably 6 days in a suitable chamber maintained at a temperature of from 85 to 160° F. and, preferably about 125° F. and after the alcohol treatment again aged for from 1 to 3 days under the same temperature conditions.

The fabric employed in accordance with this invention is preferably one containing filaments or fibers of cellulose acetate together with filaments or fibers of a non-thermoplastic compound, more preferably a fabric containing about 25 to 35% of cellulose acetate filaments or fibers and 75 to 65% of non-thermoplastic filaments or fibers. The fabric may be formed by weaving, knitting, knotting or netting the filaments or yarns of the cellulose acetate with filaments or yarns of non-thermoplastic materials into a fabric. The production of the fabric is preferably effected in such a manner that there is a uniform dispersion of the cellulose acetate filaments or yarns through the yarns or filaments of the non-thermoplastic compound. The non-thermoplastic component of the fabric may consist of cotton, regenerated cellulose, linen, natural silk etc. In weaving the fabric the cellulose acetate yarns may be arranged to alternate in the warp or in the weft or both in any desired degree to effect the uniform dispersion through the yarns of non-thermoplastic fibers.

Laminating fabric made in accordance with this invention is an improvement over laminating fabrics made in accordance with prior processes. Thus, laminating fabric made in accordance with this invention has no tendency to surface tackiness, nor to weld or coalesce into a solid tube when in roll or bolt form. Moreover, such laminating fabric does not discolor the outer layers of the composite fabric and the composite fabrics prepared with laminating fabric made in accordance with the present invention have excellent adhesive properties which are better than those of the laminating fabrics made prior to this invention.

In order to further illustrate my invention, but without being limited thereto, the following specific example is given:

*Example.*

A fabric formed by weaving 35% cellulose acetate yarns with 65% cotton yarns is treated by dipping the same into a bath containing about 60 parts dimethoxy ethyl phthalate and 40 parts of alcohol. The fabric is then passed through nip rollers to remove the excess solution of plasticizer. The temperature of concentration and time of treatment is so regulated that there remains about 30%, based on the weight of fabric, of plasticizer thereon. The fabric is then passed through a chamber heated to a temperature of about 265° F. which removes substantially all of the alcohol therefrom. In this chamber the temperature of the fabric does not reach 265° F. due to the evaporation of the solvent therefrom. The fabric is then rolled and placed in a chamber maintained at a temperature of about 125° F. for a period of about 6 days. The fabric is then unrolled and passed between nip rollers, the surface of one of which is in contact with a bath of ethyl alcohol, after which it is permitted to dry and then again aged in a chamber maintained at a temperature of about 125° F. The so-treated laminating fabric is found to be free from excessive tackiness, dry to the touch and when employed in the production of composite fabrics results in a product having an adhesion of about 50 to 100% greater than that produced by prior laminating fabrics and does not discolor the outer layers of the composite fabric.

It is to be understood that the foregoing detailed description is given merely by way of illustration and that many variations may be made therein without departing from the spirit of my invention.

Having described my invention, what I desire to secure by Letters Patent is:

1. In a process for preparing laminating fab-

1. In a process for preparing laminating fabric for adhesively uniting the components in a composite fabric, wherein a fabric containing yarns of thermoplastic textile material is coated with a plasticizer for said material and the coated fabric is aged for at least five days, the steps of wetting the aged fabric with a liquid alcoholic swelling agent for said material which is a solvent for the plasticizer, and ageing the fabric for a further period of at least one day.

2. In a process for preparing laminating fabric for adhesively uniting the components in a composite fabric, wherein a fabric containing yarns of thermoplastic textile material in admixture with yarns of cellulose is coated with a plasticizer for said material and the coated fabric is aged for at least five days, the steps of wetting the aged fabric with a liquid alcoholic swelling agent for said material which is a solvent for the plasticizer, and ageing the fabric for a further period of at least one day.

3. In a process for preparing laminating fabric for adhesively uniting the components in a composite fabric, wherein a fabric containing yarns of an organic substitution derivative of cellulose in admixture with yarns of cellulose is coated with a plasticizer for said derivative and the coated fabric is aged for at least five days, the steps of wetting the aged fabric with a liquid alcoholic swelling agent for said derivative which is a solvent for the plasticizer, and ageing the fabric for a further period of at least one day.

4. In a process for preparing laminating fabric for adhesively uniting the components in a composite fabric, wherein a fabric containing yarns of cellulose acetate in admixture with yarns of cellulose is coated with a plasticizer for the cellulose acetate and the coated fabric is aged for at least five days, the steps of wetting the aged fabric with a liquid alcoholic swelling agent for the cellulose acetate which is a solvent for the plasticizer, and ageing the fabric for a further period of at least one day.

5. In a process for preparing laminating fabric for adhesively uniting the components in a composite fabric, wherein a fabric containing yarns of organic substitution derivative of cellulose in admixture with yarns of cellulose is coated with a plasticizer for the organic substitution derivative of cellulose, said plasticizer being soluble in a lower aliphatic monohydric alcohol, and the coated fabric is aged for at least five days, the steps of wetting the aged fabric with said alcohol, and ageing the fabric for a further period of at least one day.

6. In a process for preparing laminating fabric for adhesively uniting the components in a composite fabric, wherein a fabric containing yarns of cellulose acetate in admixture with yarns of cellulose is coated with a plasticizer for the cellulose acetate, said plasticizer being soluble in a lower aliphatic monohydric alcohol, and the coated fabric is aged for at least five days, the steps of wetting the aged fabric with said alcohol, and ageing the fabric for a further period of at least one day.

7. In a process for preparing laminating fabric for adhesively uniting the components in a composite fabric, wherein a fabric containing yarns of cellulose acetate in admixture with yarns of cellulose is coated with a plasticizer for the cellulose acetate, said plasticizer being soluble in ethyl alcohol, and the coated fabric is aged for at least five days, the steps of wetting the aged fabric with said alcohol, and ageing the fabric for a further period of at least one day.

8. In a process for preparing laminating fabric for adhesively uniting the components in a composite fabric, wherein a fabric containing yarns of cellulose acetate in admixture with yarns of cellulose is coated with a plasticizer for the cellulose acetate, said plasticizer being soluble in methyl alcohol, and the coated fabric is aged for at least five days, the steps of wetting the aged fabric with said alcohol, and ageing the fabric for a further period of at least one day.

9. In a process for preparing laminating fabric for adhesively uniting the components in a composite fabric, wherein a fabric containing yarns of cellulose acetate in admixture with yarns of cellulose is coated with a plasticizer for the cellulose acetate and the coated fabric is aged for at least five days, the steps of wetting the aged fabric with a liquid alcoholic swelling agent for the cellulose acetate which is a solvent for the plasticizer, and ageing the fabric for a further period of at least one day, both stages of the ageing being effected at a temperature of 85 to 160° F.

10. In a process for preparing laminating fabric for adhesively uniting the components in a composite fabric, wherein a fabric containing yarns of organic substitution derivative of cellulose in admixture with yarns of cellulose is coated with a plasticizer for the organic substitution derivative of cellulose, said plasticizer being soluble in a lower aliphatic monohydric alcohol, and the coated fabric is aged for at least five days, the steps of wetting the aged fabric with said alcohol, and ageing the fabric for a further period of at least one day, both stages of the ageing being effected at a temperature of 85 to 160° F.

11. In a process for preparing laminating fabric for adhesively uniting the components in a composite fabric, wherein a fabric containing yarns of cellulose acetate in admixture with yarns of cellulose is coated with a plasticizer for the cellulose acetate, said plasticizer being soluble in a lower aliphatic monohydric alcohol, and the coated fabric is aged for at least five days, the steps of wetting the aged fabric with said alcohol, and ageing the fabric for a further period of at least one day, both stages of the ageing being effected at a temperature of 85 to 160° F.

12. In a process for preparing laminating fabric for adhesively uniting the components in a composite fabric, wherein a fabric containing yarns of cellulose acetate in admixture with yarns of cellulose is coated with a plasticizer for the cellulose acetate, said plasticizer being soluble in ethyl alcohol, and the coated fabric is aged for at least five days, the steps of wetting the aged fabric with said alcohol, and ageing the fabric for a further period of at least one day, both stages of the ageing being effected at a temperature of 85 to 160° F.

13. In a process for preparing laminating fabric for adhesively uniting the components in a composite fabric, wherein a fabric containing yarns of cellulose acetate in admixture with yarns of cellulose is coated with a plasticizer for the cellulose acetate, said plasticizer being soluble in methyl alcohol, and the coated fabric is aged for at least five days, the steps of wetting the aged fabric with said alcohol, and ageing the fabric for a further period of at least one day, both stages of the ageing being effected at a temperature of 85 to 160° F.

JOSEPH E. BLUDWORTH.